United States Patent [19]

Nejdl

[11] Patent Number: 5,486,808
[45] Date of Patent: Jan. 23, 1996

[54] EXTERNAL CRUISE CONTROL WARNING LIGHT

[75] Inventor: Benjamin J. Nejdl, Palatine, Ill.

[73] Assignee: Safe-Lite, Inc., Palatine, Ill.

[21] Appl. No.: 49,104

[22] Filed: Apr. 19, 1993

[51] Int. Cl.⁶ ............................................. B60Q 1/00
[52] U.S. Cl. ...................... 340/464; 340/463; 340/466; 340/467
[58] Field of Search ........................... 340/463, 464, 340/465, 466, 467, 468, 470, 471, 472, 461, 90 S

[56] References Cited

U.S. PATENT DOCUMENTS

| 2,070,432 | 2/1937 | Huebscher . | |
|---|---|---|---|
| 2,209,158 | 7/1940 | Goldsmith | 180/170 |
| 4,470,214 | 9/1984 | Kinloch . | |
| 4,574,269 | 3/1986 | Miller . | |
| 4,631,516 | 12/1986 | Clinker | 340/464 |
| 4,654,757 | 3/1987 | Birkhauser . | |
| 4,700,277 | 10/1987 | Moore . | |
| 4,751,493 | 6/1988 | Miller . | |

OTHER PUBLICATIONS

1989 Mitchell's Domestic Car Service Repair Manual.
1989 Chilton's Wiring Diagram Manual for Domestic Cars.

Primary Examiner—Victor R. Kostak
Assistant Examiner—Nathan J. Flynn

[57] ABSTRACT

The invention provides a kit for a vehicle having an electrical system and a selectively operable cruise control, for advising persons outside of the vehicle that the cruise control system is controlling the speed of the vehicle. The kit comprises a light having a light bulb and a globe or light emitting diodes, an electrical cable and a connector to connect the cable to said vehicle electrical system.

The invention also provides a vehicle comprising an engine and a cruise control coupling a speed sensor to the engine to maintain the vehicle at a fixed speed, and external warning means operable when the cruise control is engaged.

14 Claims, 3 Drawing Sheets

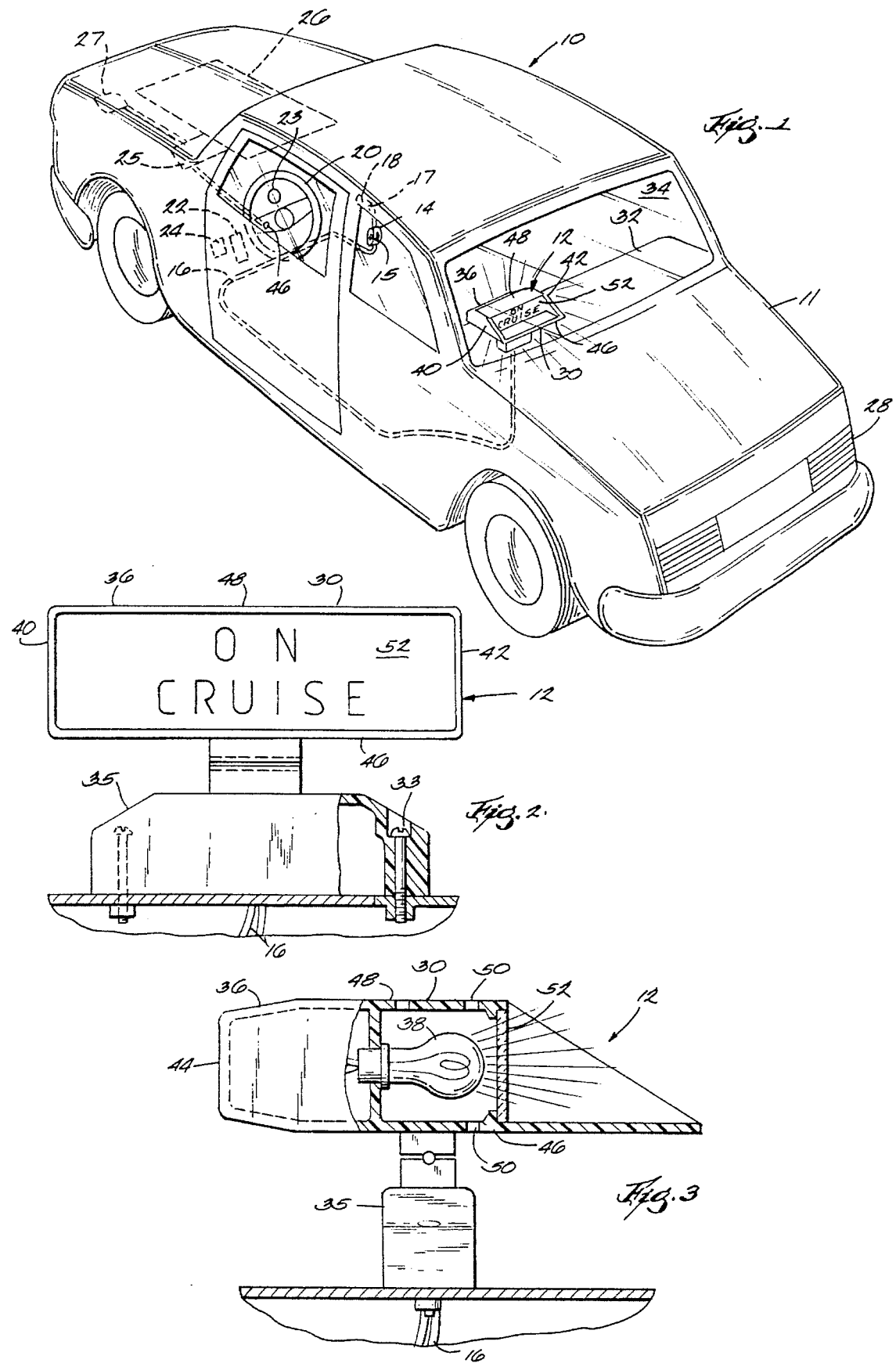

EXTERNAL CRUISE CONTROL WARNING LIGHT

BACKGROUND OF THE INVENTION

It is commonly known in the art to equip an automobile with a velocity maintenance device known as Cruise Control. In operation, the overall circuit of the cruise control can be readied, or placed in stand-by mode by depressing a switch which is commonly located on the steering column or on the dash panel. Once placed in stand-by, the cruise control is generally engaged by a push button located either on the steering wheel or on a lever or stalk located on the steering column. When engaged, the cruise control will maintain the vehicle at a constant velocity until it is deactivated. Commonly, deactivation can occur by either; pushing another push button, deactivating the stand-by mode by redepressing that button, or applying the brake pedal for the automobile.

In some automobiles, such as certain models sold under the trademarks Buick or Mazda, a light will indicate to the operator whether the cruise control circuit is in stand-by mode. In certain models of automobiles sold under the Cadillac trademark, a second light in the operator compartment will indicate to the operator whether the cruise control is actually engaged and controlling the speed of the automobile. In all instances known to the inventor, these indicator lights act only as an indication to the operator of the automobile, not to others on the exterior of the automobile.

Heretofore, there has been no external indication or means to warn others of when an automobile's velocity is stabilized, or when the cruise control is engaged. However, there has been a need for an external indication so that drivers following a automobile that is on cruise control can appreciate that the car will maintain a constant velocity. This will aid in increasing the safety of the persons in the automobile on cruise control as well as those in the automobiles immediately surrounding the automobile on cruise control by providing the surrounding drivers additional information they can use to make better decisions concerning spacing of their respective automobiles on the highway.

Moreover, this external warning means will also ease the aggravation of the driver whose automobile is on cruise control caused by a second driver who speeds up, passes the person on cruise control and then slows down once he gets ahead of the car whose velocity has been stabilized. Hopefully, the incidence of occurrence of this happening will be decreased by indicating to the second driver that the first car has not subsequently sped up, but actually has its velocity stabilized.

Reference is made to the following patents which show external indicators showing various other messages:

| Pat. No. 2,070,432 | Huebscher |
| Pat. No. 4,470,214 | Kinloch |
| Pat. No. 4,574,269 | Miller |
| Pat. No. 4,654,757 | Birkhauser |
| Pat. No. 4,700,277 | Moore |
| Pat. No. 4,751,493 | Miller |

SUMMARY OF THE INVENTION

The invention includes a kit for a vehicle having selectively operable means to automatically maintain the speed of the vehicle at a fixed rate, with the kit comprising means to advise persons outside of the vehicle that the selectively operable means is controlling the speed of the vehicle.

In one embodiment, the advising means comprises a light bulb behind a safety yellow colored globe, an electrical cable and means to connect the electrical cable to the electrical system of the vehicle. In one embodiment the globe has lettering indicating the speed control means is operable and the lettering spells the words "on cruise", "cruise on", "speed set" or "set speed".

In another embodiment, the advising means comprises a series of light emitting diodes arranged to form letters indicating that the speed control means is operable. The light emitting diodes are positioned to advise persons located behind the rear portion of the vehicle and are arranged to spell words such as "on cruise" or backlight a display having similar words.

In one embodiment, the vehicle also has an operator and an electrical switch and the advising means is engaged by actuation of the electrical switch by the operator.

In another embodiment, the selectively operable speed maintenance means comprises an electrical circuit and the speed maintenance means is engaged and disengaged by the operator making and breaking the electrical circuit and the advising means is automatically engaged and disengaged when the operator selectively engages and disengages the speed maintenance means.

In one embodiment, the electrical switch for the speed maintenance means is located on the steering column.

In another embodiment the electrical switch to disengage the speed maintenance means is activated by the vehicle braking means.

In one embodiment, the means for engaging and disengaging the advising means comprises an electrical relay with the relay sensing the presence or absence of electrical current in the speed maintenance means circuit and engaging the advising means during the presence of electrical circuit in the speed maintenance circuit.

In another embodiment, the means for automatically engaging and disengaging the advising means comprises an electrical circuit that is integrated into the speed maintenance means electric circuit.

The invention also includes an automobile comprising a propulsion means including an operator interface, means for sensing the velocity of the automobile, selectively operable automobile velocity stabilizing means coupling the operator interface and the velocity sensing means, and a warning means coupled to the velocity stabilizing means whereby the warning means notifies persons outside the vehicle that the velocity stabilizing means is operable.

In one embodiment, the automobile velocity stabilizing means comprises means to read an electrical signal of the speed sensing means, compare the signal with a speed set signal and advance or retard the throttle of the propulsion means in response to the read speed signal.

In one embodiment, the coupling means of the warning means to the velocity stabilizing means is an electrical relay, with the relay including means for sensing electrical current in the stabilizing means and means for carrying electrical current to the warning means.

In one embodiment, the coupling means of the warning means to the velocity stabilizing means is an electrical circuit that energizes the warning means when the velocity stabilizing means is actuated.

The invention also provides a vehicle comprising a propulsion means, means for controlling the propulsion means including speed sensing means, speed setting means, means for selectively coupling the speed setting means to the speed sensing means to maintain the vehicle at a fixed speed, and external warning means operable when the speed setting means is coupled to the speed sensing means.

In one embodiment, the vehicle comprises braking means and brake warning means and the means for selectively uncoupling the speed sensing to the speed setting means is coupled to the braking means. The external warning means is extinguished when the brake warning means is lit.

A principal feature of the invention is the provision of a light warning persons external to an automobile that the automobile's velocity has been stabilized.

Another principle feature of the invention is the provision that this warning or indicator light is automatically lit and extinguished when the velocity stabilizing means is engaged and disengaged.

Other features and advantages of the invention will become apparent to those skilled in the art upon review of the following detailed description, claims and drawings.

DESCRIPTION OF THE DRAWINGS

FIG. 1 is a rear top perspective of an automobile having one embodiment of the invention.

FIG. 2 is a rear elevation view of the warning light partially broken away at the base.

FIG. 3 is a side elevation view of the warning light with the light portion partially broken away.

Figure 4:
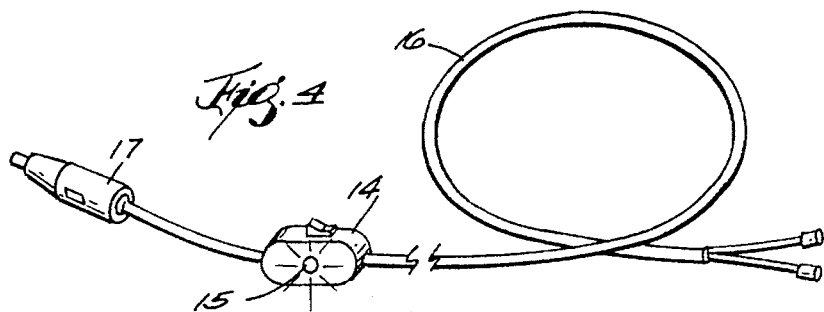
FIG. 4 is a detail of a manual wiring harness for one embodiment of the warning light.

Before one embodiment of the invention is explained in detail, it is to be understood that the invention is not limited in its application to the details of construction and arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Shown in the Figs. are various embodiments of the invention and a vehicle 10 embodying the invention. The vehicle shown is an automobile 11, although the invention would work equally well in a truck, van or bus or similar vehicle. The automobile 11 has a warning or advising means 12 indicating to those persons external to, and especially behind the automobile, that the automobile's velocity has been stabilized. The external warning means 12 can be integrated into the automobile when it is being manufactured, or it can be a kit that is added to the automobile at a later date.

Figure 8:
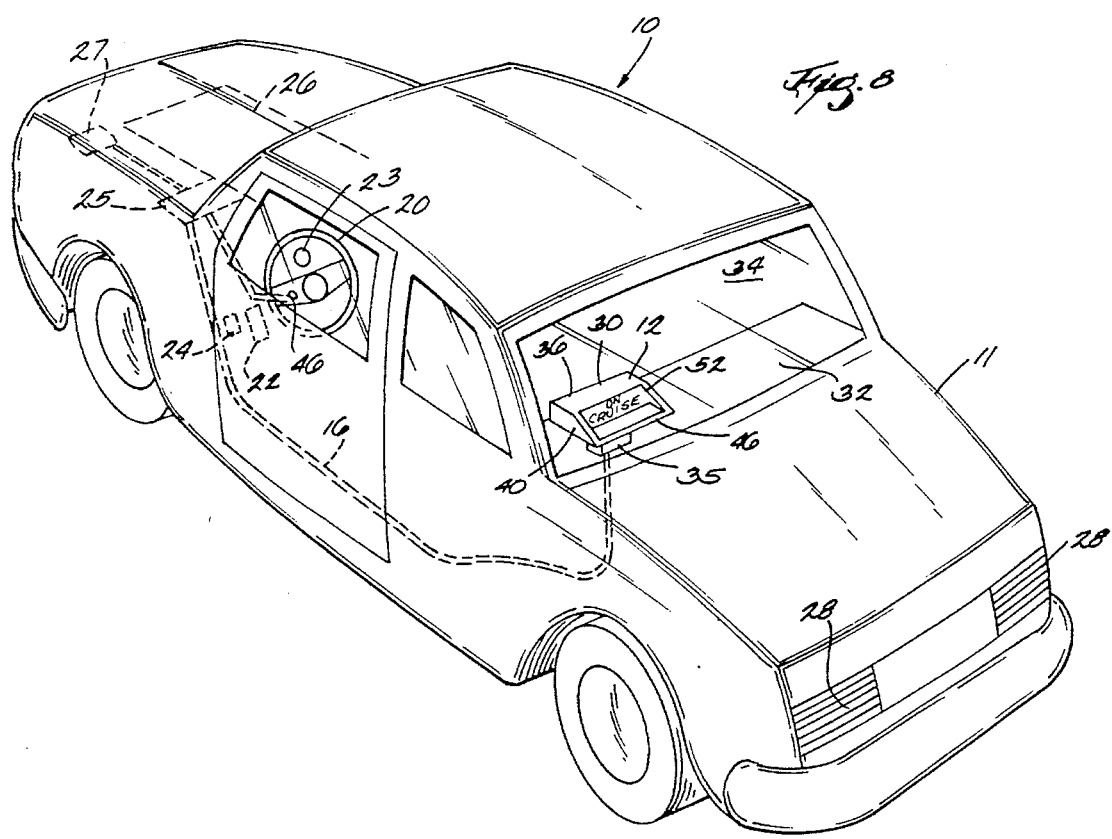
FIG. 8 is a rear top perspective view of a second embodiment of the warning light installation in an automobile.

The automobiles 11 in FIGS. 1 and 8 are otherwise typical of automobiles having an optional cruise control 25. For example, they have a standard electrical system charged by an alternator run off the engine 26 and a battery 27 regulated to approximately 12 volts. The automobiles 11 also have standard operator stations comprising a steering wheel 20 mounted on a steering column, an accelerator pedal 22, a speedometer 23, and a brake pedal 24.

The accelerator pedal 22 is operatively connected to a throttle means for the engine 26 to accelerate the vehicle 10 and maintain or vary its velocity. The brake pedal 24 is operatively connected to brakes in the wheels to decelerate the vehicle and is also electrically connected to brake lights 28 in the rear of the vehicle which are illuminated when the brakes are applied and the vehicle is decelerating.

The automobiles 11 in FIGS. 1 and 8 are also equipped with a selectively operable velocity stabilizing means or cruise control system 25 that is common in the art. Specifically, the cruise control 25 comprises an electrical logic circuit that reads a velocity or speed input from the speedometer 23 or speed measuring means and attempts to maintain the automobile at a constant rate of speed by advancing or retarding the throttle of the engine 26.

As is common in the art, the cruise control circuit is put in a stand-by mode by the vehicle operator (not shown) depressing a first stand-by on/off switch 44 (not shown). Once the system is in stand-by, the cruise control system can be selectively engaged by depressing a second switch 46 variously called "set" or "accelerate". If the "set" switch 46 is pushed momentarily, the velocity of the automobile is kept at the speed at which the switch was set. If the "set" switch 46 is held down, the car will accelerate to a speed at which the switch is let up and then maintained at that speed. Both the stand-by switch 44 and the "set" switch are generally located on a stalk or lever protruding from the steering column or on the steering wheel 20.

The cruise control system can be disengaged, and the automobile allowed to coast or decelerate, in one of the following three ways: 1) depressing a third switch 58 also located on a stalk or lever on the steering wheel 20 entitled "coast"; 2) redepressing the first stand-by on/off switch 44; or 3) pushing the brake pedal 24. To this point, a vehicle of this construction is common in the art.

In a preferred embodiment, the invention provides an external warning or advising means 12 which comprises an external indicator light 30 that is mounted on the back deck 32 of the passenger compartment of the automobile 10. The light 30 is positioned to shine out the rear window 34 so that it can be clearly seen by persons outside of and especially behind the vehicle 10. Other types of vehicles not having back decks, such as station wagons or vans, will require embodiments wherein the light 12 will be mounted directly to the inside of the rear window or on a wall directly above or below the rear window and allowed to shine through the rear window.

As seen in FIGS. 2 and 3, in one embodiment, the external indicator or warning light 30 comprises a base 35 to be mounted on the rear deck 32 by means of screws 33 and a light box 36 holding a light bulb 38 mounted on top of the base. The light box 36 has a pair of solid side walls 40 and 42 and a solid front wall 44. These walls are preferably coated with reflective material so that most of the light emitted from the light bulb 38 mounted inside shines rearwardly. The light box also has a bottom wall 46 and a top wall 48 both of which preferably have apertures 50 (see FIG. 3) to allow for air flow to cool the light bulb 38. Instead of a single bulb as shown in the drawings, the light may comprise a series of bulbs or a series of light emitting diodes or a display using fiber optics.

Immediately behind the light bulb is a globe 52 which makes up the rear wall of the light box. In a preferred embodiment, the globe is a translucent safety yellow color and contains opaque letters spelling words indicating that the vehicle's velocity is being stabilized, such as "on cruise", "cruise on", "speed set" or "set speed". In another embodiment, the light comprises a series of light emitting diodes arranged to spell similar words, or arranged to also backlight a globe having similar words printed thereon.

In the embodiment shown in FIG. 1, in addition to the light 30, the external warning means 12 also comprises an electrical cable 16, a switch 14 and a plug 17. This depicts one manual version of the invention wherein the operator can manually illuminate the warning light 30 by means of operating an on/off switch 14. This embodiment can also easily be installed as a kit in an existing automobile having a cruise control.

In this embodiment, the display or light 30 is connected to the electrical power source of the automobile 11 by an electric cord 16 terminated by a plug 17 which is plugged into the automobile cigarette lighter socket 18. In other similar embodiments, the external warning light 30 could be connected to the automobile electrical system in other ways, such as being connected directly to terminals on the electrical fuse box generally mounted under the dash.

In the embodiment shown in FIG. 1, the manual switch 14 also includes an operator indicator light 15 which is lit to advise the operator when the manual switch 14 is thrown to the on position and the external warning light 30 is lit.

FIG. 4 is a detail drawing of a portion of the kit comprising the cruise control external warning or advising means 12 shown in FIG. 1. This shows the plug 17 which can be inserted into the cigarette lighter 18 at the first end of the electrical cable 16, the manual switch 14 and operator indicator light 15. The second end of the cable 16 is connected to the external indicating means 30.

Figure 5:
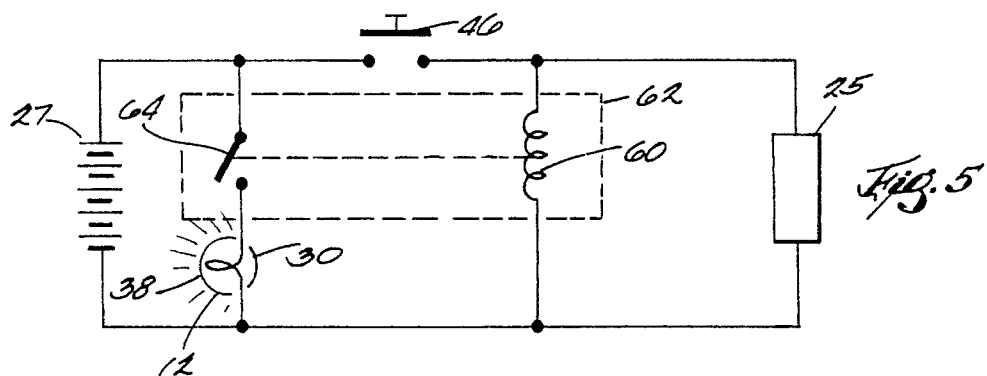
FIG. 5 is a electrical circuit of one embodiment of the warning light circuitry.

FIG. 5 depicts a circuit diagram for a second embodiment of the warning or indicating means 12 which, like the embodiment shown in FIGS. 1 and 4, can be installed as a kit to an automobile 11 with an existing cruise control means 25 relatively easily. The circuit of FIG. 5 shows an electrical power source, such as a battery 27 supplying power to the circuit. A cruise control set switch 46 activates the circuit. As is common in the art, when the cruise control set switch 46 is made, electricity flows through the cruise control module 25 and the velocity of the automobile 11 is stabilized.

In addition, when the cruise control set switch 46 is made, electricity also flows through the power coil 60 for an electrical relay 62. A suitable relay is the FEME M 15 MAH 1008 12 VDC. The electricity flowing through the power coil 60 of the relay 62 causes the relay switch 64 to close allowing electricity to also flow through the external warning means 12 causing illumination of the light 30 thereof. Accordingly, when the cruise control 25 is engaged and disengaged, the external warning means 12 is automatically illuminated or turned off respectively. In other words, when the "set" switch 46 is activated, the external display light 30 is lit until one of the three ways to disengage the cruise control, such as depressing the brake pedal, is accomplished. It can be appreciated that the external display light 30 is extinguished when the brake lights 28 are lit.

It can also be appreciated that a kit having a circuit similar to that of the second embodiment shown in FIG. 5 can be easily added to an automobile 11 having a standard cruise control system 25 by installing the relay in conjunction with the circuit that would be activated when the cruise control 25 is engaged. The relay power coil will then close the switch 64 to operate the external warning or indicating light. Electrical cable 16 will also have to be run from the relay 62 which would probably be located either in the engine compartment of under the dash to the light 30 near the rear window 34.

Figure 6:
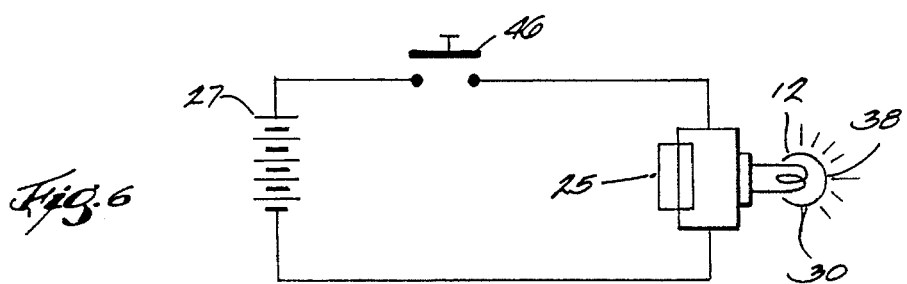
FIG. 6 is an electrical circuit showing another embodiment of the warning light circuitry.
Figure 7:
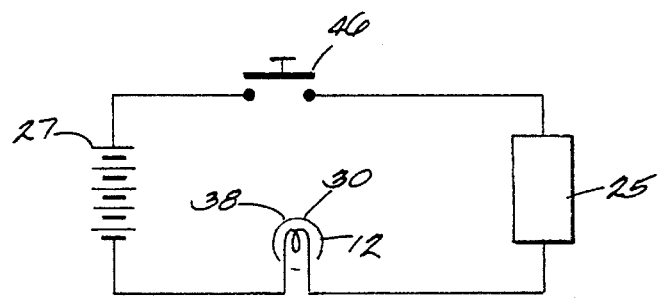
FIG. 7 shows an electrical circuit of another embodiment of the warning light circuitry.

FIGS. 6 and 7 are circuit diagrams depicting electrical circuits in which the external warning means 12 is incorporated into the wiring of the automobile. FIG. 6 shows the exterior warning light 30 incorporated into a parallel circuit to the cruise control module 25. By this circuit arrangement, whenever the cruise control set switch 46 is engaged, electricity will flow to both the module 25 and the circuit for the external warning means 12 and light 30, including the light bulb 38. In this circuit, similar that of FIG. 5, or the manual switch version of FIGS. 1 and 4, the cruise control 25 will operate even if the light bulb 38 is burned out.

The circuit depicted in FIG. 7 shows the external warning means 12 and light 30, including the light bulb 38, in a circuit in series with the cruise control module 25. In this circuit, the cruise control 25 will not control the speed of the automobile 11 if the light bulb 38 is burned out because electricity will not be able to complete its path around the circuit.

The embodiments of FIGS. 6 and 7 can be incorporated into the wiring of an automobile 11 during its initial design and manufacture. However, depending on the wiring of the particular automobile, they could also be added after manufacture if the existing wiring modules are accessible.

It can be appreciated that the description and drawings reveal a simple and effective means to warn persons on the exterior of the vehicle that its velocity is being stabilized. It is anticipated that this information will allow others to drive more safely as well as more fuel efficiently, as surrounding automobiles will have more information with which to maintain proper spacing on the highway.

Various features of the invention are set forth in the following claims.

I claim:

1. A kit for a vehicle having a rear window, an internal combustion engine, an operator, an electrical system and means for the operator to maintain the speed of the vehicle fixed at any operator selectable speed, said kit comprising a light mounted immediately in front of said rear window, said light having lettering indicating said speed maintenance means is operable when said light is activated, an electric cable connected to said light, and operator controllable means for connecting the electric cable to said vehicle electrical system to create an electric circuit to activate said light, said operator controllable means comprising electrical relay means, said electrical relay means comprising means for sensing said speed maintenance means is activated and switch means for connecting said light to said electrical system, whereby when said light is activated by connecting said electric cable to said vehicle electrical system persons outside of the vehicle are advised the speed of the vehicle is being maintained at a fixed rate.

2. The kit of claim 1 wherein said lettering spells the words "ON CRUISE" or "CRUISE ON".

3. The kit of claim 1 wherein said lettering spells the words "SPEED SET" or "SET SPEED".

4. The kit of claim 1 wherein said light comprises a series of light emitting diodes arranged to form letters indicating that said speed control means is operable.

5. The kit of claim 1 wherein said light comprises a series of light emitting diodes behind a globe and said globe has lettering indicating that said speed control means is operable.

6. An automobile having an operator, the automobile comprising a rear window and a propulsion means including an operator interface, means for sensing the velocity of the automobile, velocity stabilizing means allowing said operator to set and stabilize the velocity of the automobile at any desired speed and velocity stabilization warning means mounted immediately inside the rear window, said velocity stabilization warning means comprising at least one light and a single set of alphanumeric characters coupled to said velocity stabilizing means by an electrical relay, said relay including means for sensing electrical current to said stabilizing means and means for carrying electrical current to said warning means whereby said warning means automatically notifies persons outside of the automobile that said velocity stabilizing means is operable when said operator sets and stabilizes the velocity of the automobile.

7. The automobile of claim 6 wherein said propulsion means comprises an internal combustion engine and said operator interface comprises a throttle valve for said internal combustion engine and an accelerator pedal linked to said throttle valve.

8. The automobile of claim 7 wherein said means for sensing the speed of the automobile also comprises means for converting said speed sensed into an electrical signal.

9. The automobile of claim 8 wherein said velocity stabilizing means also comprises means to convert said set velocity to an electrical signal.

10. The automobile of claim 9 wherein said velocity stabilizing means comprises means to read said electrical signal of said speed sensing means, compare said signal with said speed set electrical signal and advance or retard said throttle in response to said read speed signal.

11. A vehicle having an operator, said vehicle comprising a rear window and a propulsion means including an internal combustion engine, means for said operator to control said propulsion means including speed sensing means, speed setting means, means for selectively coupling said speed setting means to said speed sensing means to maintain the vehicle at a fixed speed selected by said operator, and means for selectively uncoupling said speed setting means to said speed sensing means, and external velocity stabilization warning means comprising relay means for sensing coupling of said speed setting means to said speed sensing means and at least one light and a single set of alphanumeric characters mounted immediately inside the rear window, and operable when said speed setting means is coupled to said speed sensing means for warning persons outside of the vehicle that the speed of the vehicle is being maintained at a fixed rate.

12. The vehicle of claim 11 also comprising a steering column and wherein said means for selectively coupling said speed setting means to said speed sensing means comprises an electrical switch mounted on said steering column.

13. The vehicle of claim 11 also comprising braking means and brake warning means and said means for selectively uncoupling said speed sensing means to said speed setting means is coupled to said braking means.

14. The vehicle of claim 13 wherein said external warning means is extinguished when said brake warning means is lit.

\* \* \* \* \*